No. 735,440. Patented August 4, 1903.

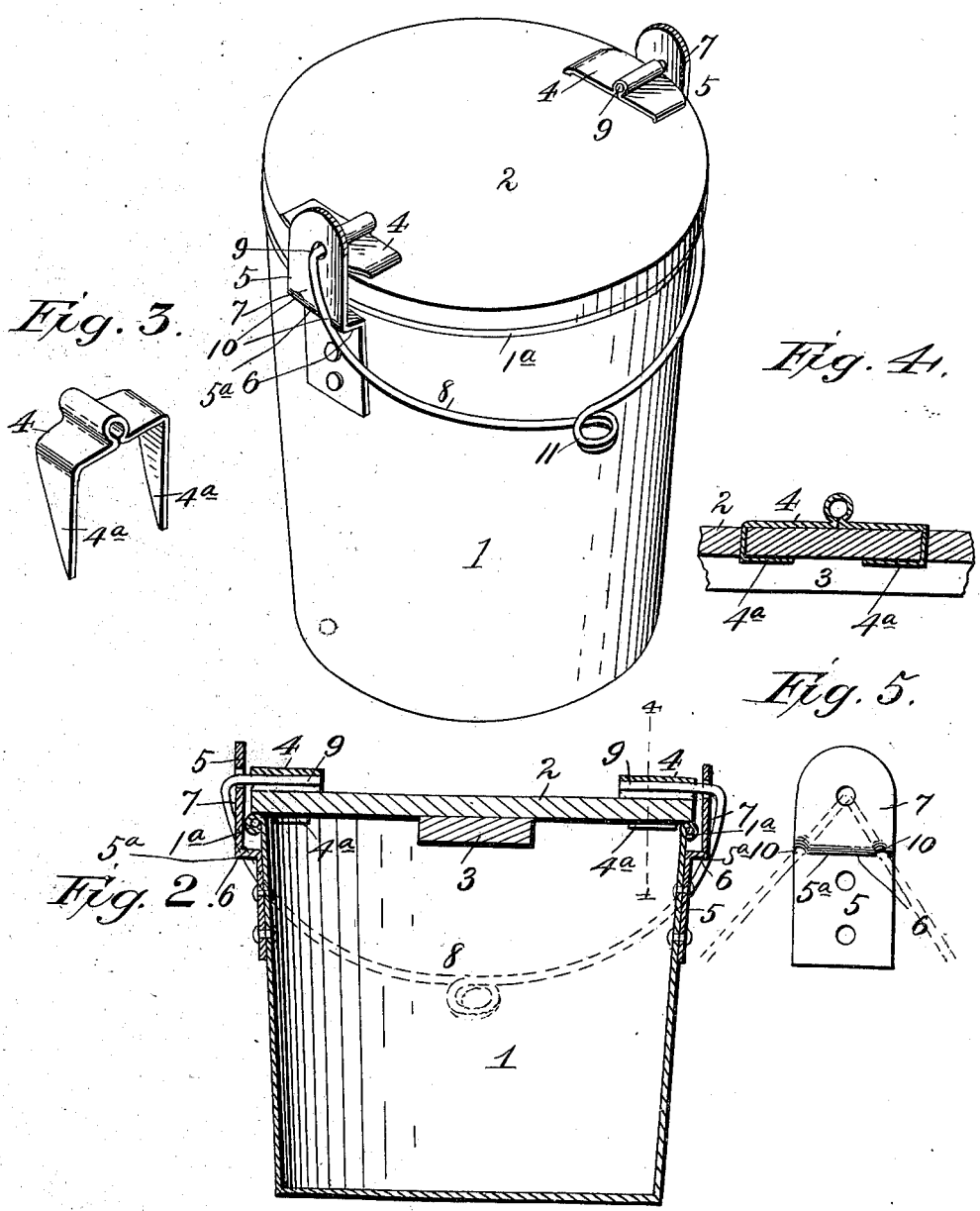

UNITED STATES PATENT OFFICE.

TELESPHORE BABIN AND ADAM OLIVER HEBERT, OF HOUMA, LOUISIANA.

BUCKET.

SPECIFICATION forming part of Letters Patent No. 735,440, dated August 4, 1903.

Application filed February 17, 1903. Serial No. 143,749. (No model.)

*To all whom it may concern:*

Be it known that we, TELESPHORE BABIN and ADAM OLIVER HEBERT, citizens of the United States, residing at Houma, in the parish of Terrebonne and State of Louisiana, have invented new and useful Improvements in Buckets, of which the following is a specification.

Our invention relates to buckets; and the object of the same is to provide means for securely locking the cover on the bucket and also to hold the bail from swinging.

The simple and novel construction employed by us in carrying out our invention is fully described and claimed in this specification and illustrated in the accompanying drawings, forming a part thereof, in which—

Figure 1 is a perspective of a bucket embodying our invention. Fig. 2 is a longitudinal section thereof. Fig. 3 is a detail perspective of one of the keepers before setting. Fig. 4 is a sectional view of a keeper fastened to the lid, the section being taken on the line 4 4, Fig. 2. Fig. 5 is a detail elevation of one of the ears.

Like numerals of reference designate like parts in the different views of the drawings.

The numeral 1 designates a bucket of ordinary construction and made of tin, wood, or other suitable material. A cover 2 is fitted on the bucket 1 and comprises a circular disk equal to the outer diameter of the top of the bucket and resting on the rim $1^a$ thereof. A cleat 3, equal to the diameter of the bucket, is secured to the under side of the cover and prevents lateral movement of the cover. Keepers 4 are seated in the cover 2 at diametrically opposite points and bear tangs $4^a$, which extend through the cover 2 and are turned over in contact with the under side thereof. Perforated ears 5 are rigidly secured to the bucket 1, adjacent to the rim thereof, and each is bent at right angles at 6 and 7 outwardly and upwardly, respectively, to form a ledge $5^a$. A bail 8 is provided and has its extremities bent at right angles to form pintles 9, which pass through the ears 5 and engage the keepers 4 to secure the cover 2 in place. Notches 10 are formed in the corner 7 and serve to engage the bail when swung in its lowermost position to hold it against accidental displacement. An eye 11 is formed on the bail 8 and consists of one or more coils of the wire to serve to intensify the resilient action of the bail when engaging the notches 10.

When it is desired to remove the cover 2, the pintles 9 are withdrawn by springing the sides of the bail 8 out. The cover may be slightly rotated in replacing it or the pintles 9 bent up and the bucket used as an ordinary bucket.

We do not wish to be limited as to details of construction, as these may be modified in many particulars without departing from the spirit of our invention.

Having thus described our invention, what we claim as new, and desire to secure by Letters Patent, is—

The combination with a bucket, of apertured ears mounted on said bucket at diametrically opposite points, of a cover fitting intermediate said ears, keepers seated in said cover and located in alinement with said ears, and a bail having inwardly-turned ends which pass through the apertures in said ears and into said keepers thereby forming a permanent handle for said bucket and rigidly securing said cover against movement, substantially as described.

In testimony whereof we have hereunto set our hands in presence of two subscribing witnesses.

TELESPHORE BABIN.
ADAM OLIVER HEBERT.

Witnesses:
ROBT. B. BUTLER,
J. C. BRIANT.